United States Patent [19]

Jablonski et al.

[11] 4,429,847

[45] Feb. 7, 1984

[54] SPRING BYPASS ASSEMBLY

[75] Inventors: Henry Jablonski, San Jose; Jeffrey D. Roughgarden, Palo Alto, both of Calif.

[73] Assignee: The United States of America as represented by the United States Department of Energy, Washington, D.C.

[21] Appl. No.: 384,306

[22] Filed: Jun. 2, 1982

[51] Int. Cl.³ .............................................. F16L 3/08
[52] U.S. Cl. ................................... 248/74 R; 24/279; 248/DIG. 1
[58] Field of Search .................. 248/74 R, 316 C, 63, 248/DIG. 1; 24/279, 243 B, 248 SA; 285/367, 410, 373, 419; 403/344

[56] References Cited

U.S. PATENT DOCUMENTS

| 2,977,995 | 4/1961 | Walpole | 24/279 |
| 3,249,370 | 5/1966 | Brogden | 24/279 |
| 3,513,512 | 5/1970 | Phillips | 24/279 |
| 3,565,468 | 2/1971 | Garrett | 24/279 |
| 4,365,393 | 12/1982 | Hauffe et al. | 24/279 |

FOREIGN PATENT DOCUMENTS 1050041  2/1959  Fed. Rep. of Germany ...... 411/156

Primary Examiner—William H. Schultz
Assistant Examiner—Ramon O. Ramirez
Attorney, Agent, or Firm—Edwin D. Grant; Stephen D. Hamel

[57] ABSTRACT

Pipe clamp comprises two substantially semicircular rim halves biased toward each other by spring assemblies. Adjustable stop means limit separation of the rim halves when the pipe expands.

4 Claims, 1 Drawing Figure

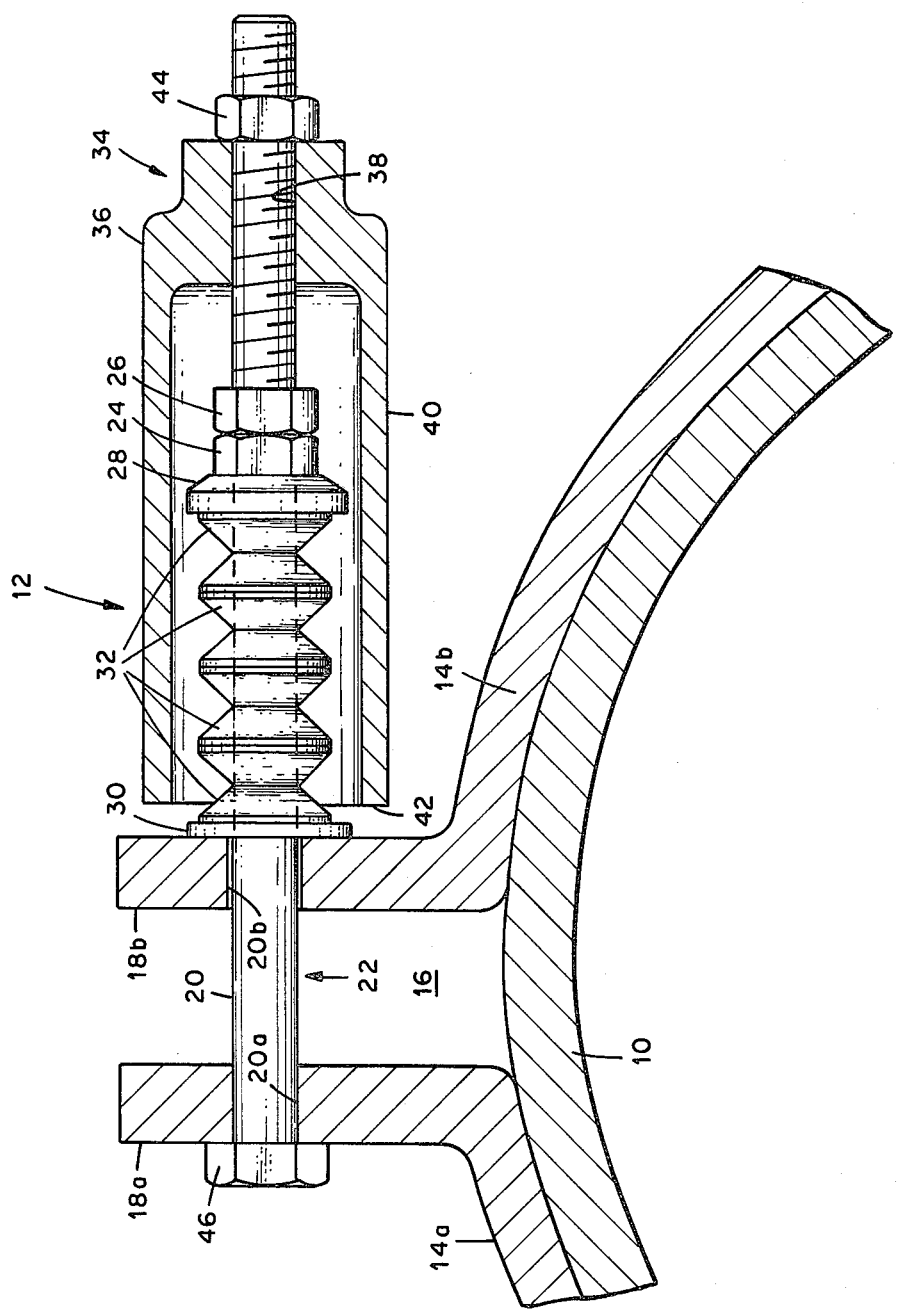

SPRING BYPASS ASSEMBLY

BACKGROUND OF THE INVENTION

This invention, which resulted from a contract with the U.S. Department of Energy, relates to a means for supporting or restraining a pipe or other object.

More particularly, the invention relates to an assembly that limits gross separation of spring-preloaded pipe clamp halves.

In certain nuclear power installations, pipe clamps for use on high-temperature, thin-walled piping must be designed with great care to ensure that they will not induce unacceptably high local stresses in the piping. Most clamps used with piping for a liquid metal breeder reactor comprise two clamp halves held on a pipe under a preloaded stress by opposed pairs of bolt and spring assemblies. There are a number of problems associated with conventional pipe clamps of this type. To accommodate high reaction loads in a manner that is acceptable from a stiffness standpoint, preload must be raised to a point that is unacceptable from a stress standpoint. Conversely, to obtain acceptable local pipe stresses, preload must be reduced to a point where the assembly is too "soft" to support adequately a piping system under dynamic loads. In addition, detailed finite element analyses have shown that the stiffness of conventional spring-preloaded pipe clamps varies considerably with the sign and magnitude of a reaction load; that is, spring curves for such clamps are highly nonlinear. The significance of this phenomenon is that since conventional piping systems analyses employ linear spring support submodels, it is desirable that the actual support behaves linearly as assumed so as not to jeopardize conventional analysis. Still another problem associated with clamps that use high preloads to accommodate high reaction forces is that the very stiff springs used to achieve the high preloads induce an often overlooked stress penalty. In the course of temperature-induced expansion of a pipe held by a conventional clamp, the flanges of the clamp move apart, further compressing the spring assemblies. This increment of hot preload over cold preload is disadvantageous because, aside from stiffness considerations, the optimal preload is the lowest that prevents slipping of a clamp on a pipe.

SUMMARY OF THE INVENTION

It is therefore an object of this invention to provide an arrangement for attaching a clamping collar to a pipe so that preload-induced local pipe stress is minimized and clamp stiffness is maintained at a high and relatively constant value.

Another object of the invention is to preclude excessive separation of pipe clamp halves of the spring-loaded type.

These objects are achieved by a preferred embodiment of the invention comprising a clamp rim conforming to the periphery of a pipe and extending substantially completely thereabout with at least one contraction and expansion gap interrupting its continuity, ends of said rim at said gap being formed with flanges which project radially outward from said pipe in spaced but juxtaposed relation to each other, an aperture extending through each flange in a circumferential direction relative to said pipe, a bolt extending through the apertures in said flanges, the shank of said bold projecting from one flange on the side thereof remote from the other flange, the head of said bolt abutting said other flange, Belleville springs extending around said projecting portion of said bolt shank, a nut engaged with said bolt shank for compressing said Belleville springs between the nut and said one flange under a predetermined stress, an elongte stop element having a first portion formed with an aperture through which the shank of said bolt extends and a tubular portion which projects from said first portion toward said one flnge and is normally spaced therefrom to allow a predetermined expansion of said pipe before said one flange engages the adjacent end of the tubular portion, and a nut engaged with the shank of said bolt to adjustably hold said stop element at different locations along the length of said shank.

DESCRIPTION OF THE DRAWING

The accompanying drawing is a sectional view of components of the preferred embodiment of the invention.

DETAILED DESCRIPTION OF THE PREFERRED EMBODIMENT OF THE INVENTION

In the drawing, reference number 10 designates a section of the wall of a pipe, and reference number 12 generally designates a collar assembly which is attached by suitable conventional means (not illustrated) to other structure to support the pipe or restrain its movement. The collar assembly comprises a clamp rim which preferably is formed of two substantially semicircular segments 14a, 14b but which in some cases can consist of a single substantially circular element. In either arrangement the clamp rim is shaped to conform with the periphery of pipe 10 and extends substantially completely thereabout. However, in the illustrated embodiment of the invention wherein the clamp rim consists of two substantially semicircular segments 14a, 14b, the continuity of the rim around pipe 10 is interrupted by two contraction and expansion gaps located at diametrically opposed points on the perimeter of the pipe and between the juxtaposed ends of the segments, only one of these gaps being illustrated in the drawing for the sake of simplicity and designated therein by reference number 16. If the clamp rim is substantially circular in form, its continuity about the perimeter of pipe 10 is, of course, interrupted by only a single contraction and expansion gap. It will be understood that the width of the contraction and expansion gap 16 between juxtaposed ends of segments 14a, 14b of the clamp rim can vary in different applications of the invention.

Respectively integrally joined to the juxtaposed ends of rim segments 14a, 14b and projecting radially outward from pipe 10 are flanges 18a, 18b. Apertures 20a, 20b respectively extend through these flanges in a circumferential direction relative to pipe 10, and the shank 20 of a bolt 22 is disposed in these apertures and projects from the side of flange 18b remote from flange 18a. Two nuts, 24, 26 are engaged with the threaded portion of shank 20 of the bolt, a first washer 28 is placed on the shank and abuts nut 24, a second washer 30 is also placed on the shank and abuts flange 18b, and a plurality of Belleville springs 32 are mounted on the shank between washers 28, 30.

Reference number 34 generally designates an elongate stop element having a first portion 36 formed with an aperture 38 in which shank 20 is threadedly engaged. Preferably the end of portion 36 of stop element 34 has a square or hexagonal cross-sectional shape to facilitate turning the stop element with a wrench. Stop element 34 also includes a second tubular portion 40 which is integrally connected to first portion 36 and projects therefrom toward flange 18b, the free end 42 of this second portion of the stop element being normally spaced a short distance from the aforesaid flange. Lastly, a third nut 44 is engaged with the end of shank 20 of bolt 22 and abuts stop element 34.

OPERATION OF THE PREFERRED EMBODIMENT OF THE INVENTION

It will be recognized that the forces exerted against flanges 18a,18b on each side of pipe 10 by the head 46 of bolt 22 and washer 30 can be adjusted to a predetermined value by turning nut 24 to compress Belleville springs 32. Nut 26 is then used to lock nut 24 in position. The gap between flange 18b and the adjacent end 42 of stop element 34 can be adjusted by turning the stop element to move it axially of the shank 20 of bolt 22.

During the expansion of pipe 10 as its temperature rises from ambient to operating temperature, flanges 18a,18b separate until flange 18b contacts end 42 of stop element 34. Thus at the operating temperature of pipe 10, collar assembly 12 is a truly solid ring clamp. The required initial gap between flange 18b and stop element 34 can be well-approximated by engineering calculations, which for highest precision can utilize finite element analysis. The arrangement of collar assembly 12 permits convenient adjustment of the compression of Belleville springs 32 and the gap between flange 18b and stop element 34 during the use of pipe 10.

The design of collar assembly 12 permits the use of soft low preloads even for "heavy duty" clamps, without adverse effects on clamp stiffness characteristics, since stop element 34 prevents separation of the clamp halves after the gap between flange 18b and the stop element is taken up. Hence the need for high preloads (and the resultant pipe stress penalty) is eliminated. Accordingly, with the described collar assembly preload is set as low as necessary to prevent slippage of clamp rim halves 14a,14b on pipe 10. The design of collar assembly 12 permits the use of soft spring assemblies, again without effect on stiffness. The advantage of a soft spring is that the cold preload to hot preload stress is minimized. However, without the use of stop element 34, soft springs permit too much clamp half separation and thus are unacceptable from a stiffness standpoint. The load displacement curves for clamps constructed in accordance with principles of the invention are well suited for linear approximations because the dominant source of nonlinearity is gross separation of clamp halves. The design concept of collar assembly 12 therefore justifies the linear support submodels used by piping system analysis. The adjustability of the components of clamp assembly 12 enables use of standard tolerance piping since the gap between flange 18b and stop element 34 can be inspected at different temperatures of pipe 10 and adjusted to account for minor variations in the shape of the pipe.

Various modifications can obviously be made in the design of a restraint collar of the type disclosed without departing from the basic principles of the invention. For example, a plurality of arms projecting from first portion 36 of stop element 34 toward flange 18b can be substituted for the tubular structure 40 of the preferred embodiment of the invention.

What is claimed is:

1. A collar assembly for restraining an object, comprising:
   a clamp rim conforming to the periphery of said object and extending substantially completely thereabout with at least one contraction and expansion gap interrupting its continuity about said object, ends of said rim at said gap being formed with flanges which project radially outward from said object in spaced but juxtaposed relation to each other, an aperture extending through each of said flanges in a circumferential direction relative to said object;
   means for resiliently biasing said flanges toward each other, comprising (1) a shaft extending through the aperture in each of said flanges and projecting away from one flange on the side thereof remote from the other flange, (2) annular spring means extending around the projecting portion of said shaft, and (3) means mounted on the projecting portion of said shaft for holding said spring means against said one flange; and
   means for limiting movement of said flanges away from each other, comprising (1) an elongate stop element having a first portion formed with an aperture through which said shaft extends and a second portion which projects from said first portion toward said one flange and is normally spaced therefrom to allow a predetermined expansion of said object and separation of said flanges before said one flange engages the second portion, and (2) means for adjustably holding said stop element at different locations along the length of said shaft.

2. The collar assembly of claim 1 wherein:
   said shaft is a bolt, the head of which abuts the flange spaced from said spring means;
   said means for holding said spring means against said one flange comprises a nut engaged with said bolt;
   said means for adjustably holding said stop element at different locations along said shaft is a nut engaged with said bolt;
   said second portion of said stop element is tubular; and
   said spring means comprises a plurality of Belleville springs.

3. The collar assembly of claim 2 wherein said object is a pipe.

4. The collar assembly of claim 3 wherein:
   said clamp rim is formed of two sustantially semicircular rim halves; and
   a means for resiliently biasing each pair of juxtaposed ends of said halves toward each other is provided as defined in claim 3.

* * * * *